Jan. 5, 1937. H. E. SWIFT 2,066,430
MOTOR VEHICLE
Original Filed Sept. 25, 1930 7 Sheets-Sheet 1
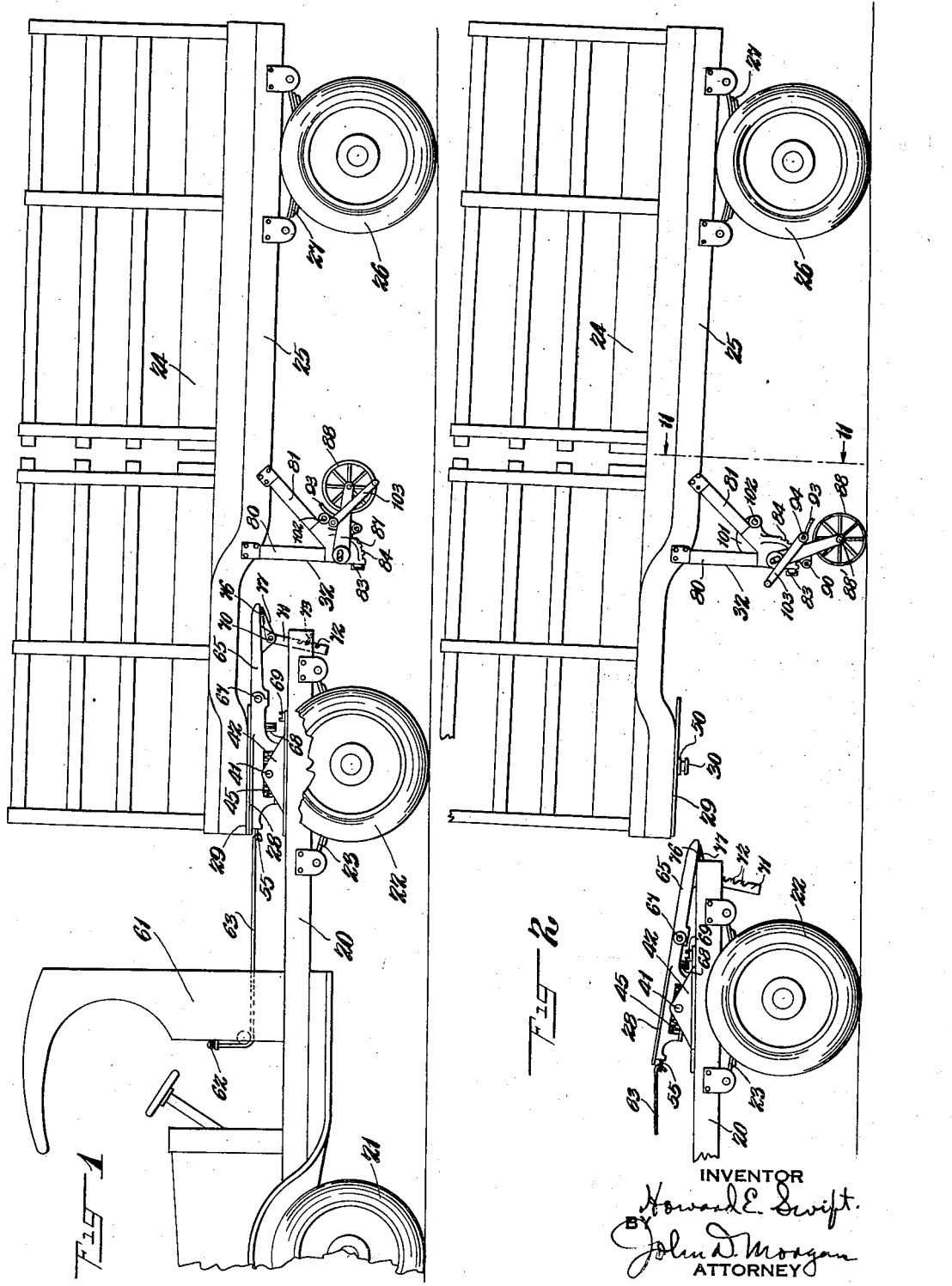
INVENTOR
Howard E. Swift.
BY John D. Morgan
ATTORNEY

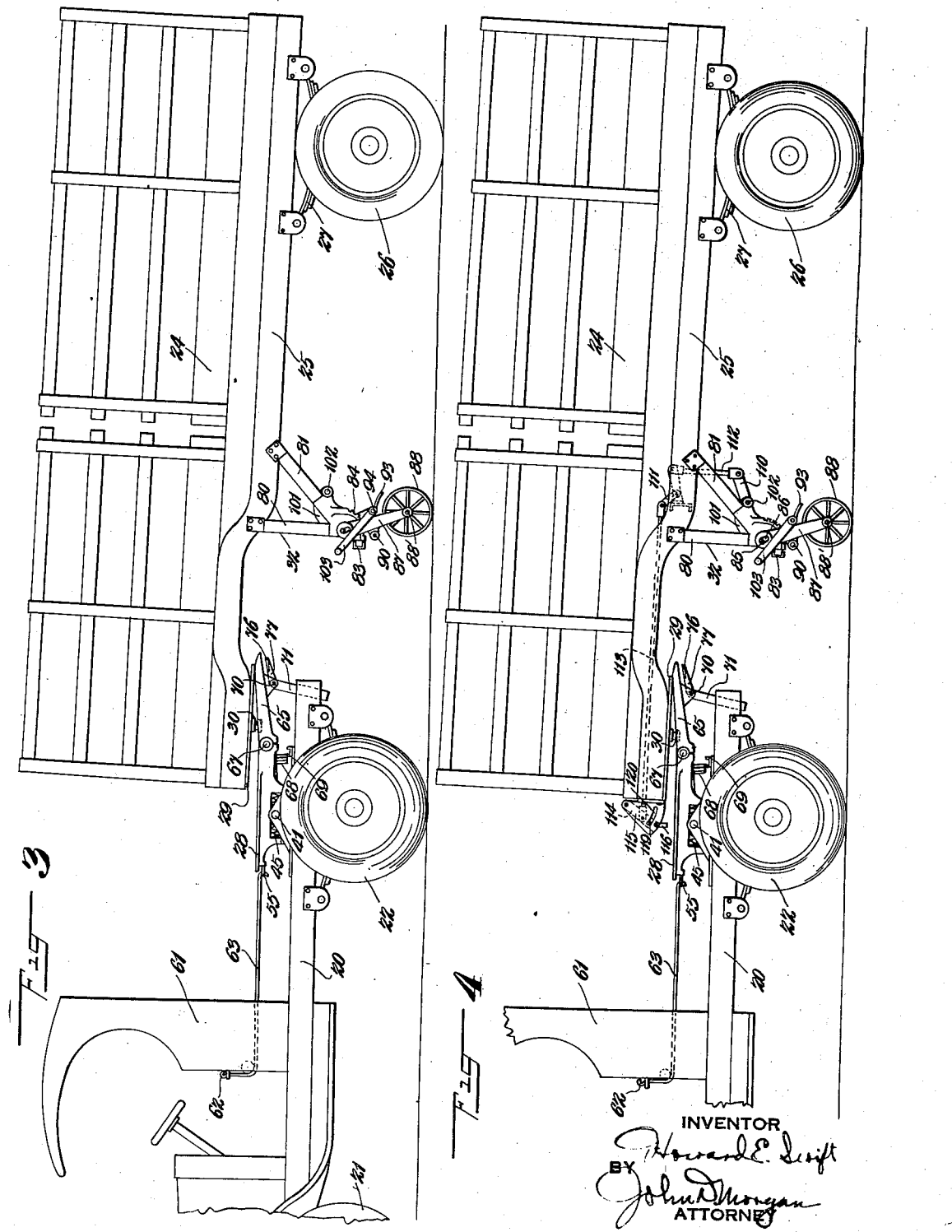

Jan. 5, 1937. H. E. SWIFT 2,066,430
MOTOR VEHICLE
Original Filed Sept. 25, 1930 7 Sheets-Sheet 3
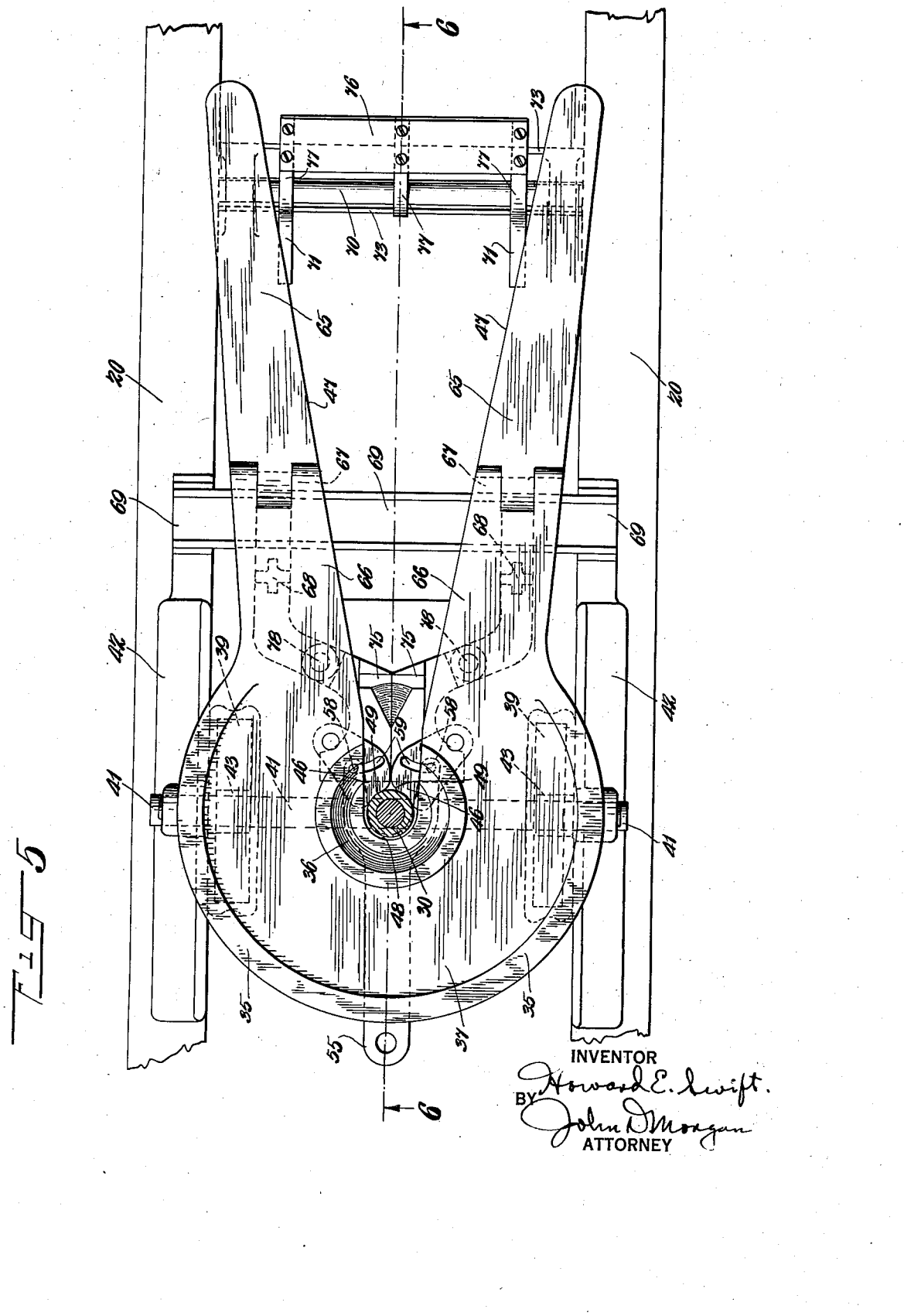

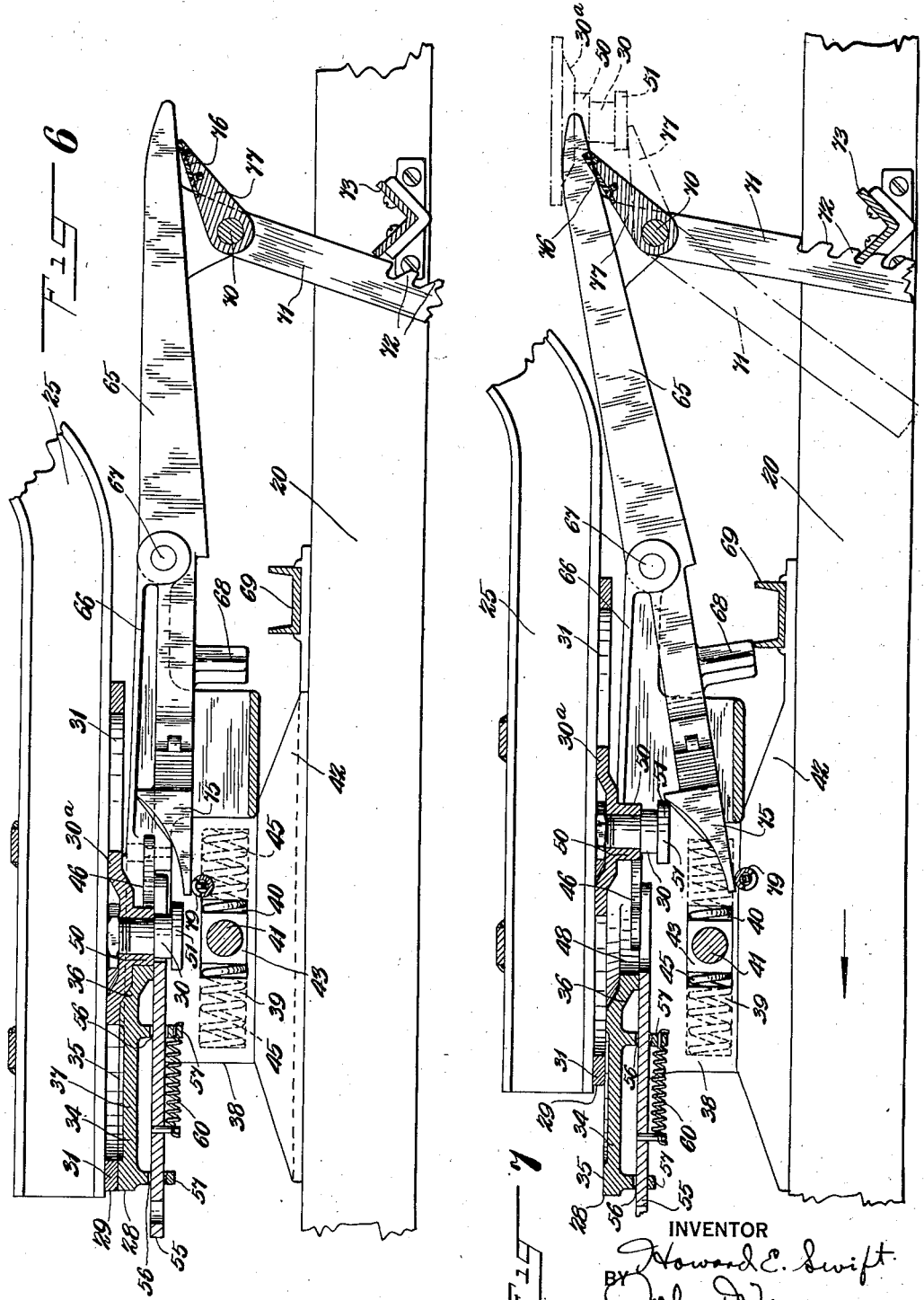

Jan. 5, 1937.    H. E. SWIFT    2,066,430
MOTOR VEHICLE
Original Filed Sept. 25, 1930    7 Sheets-Sheet 5
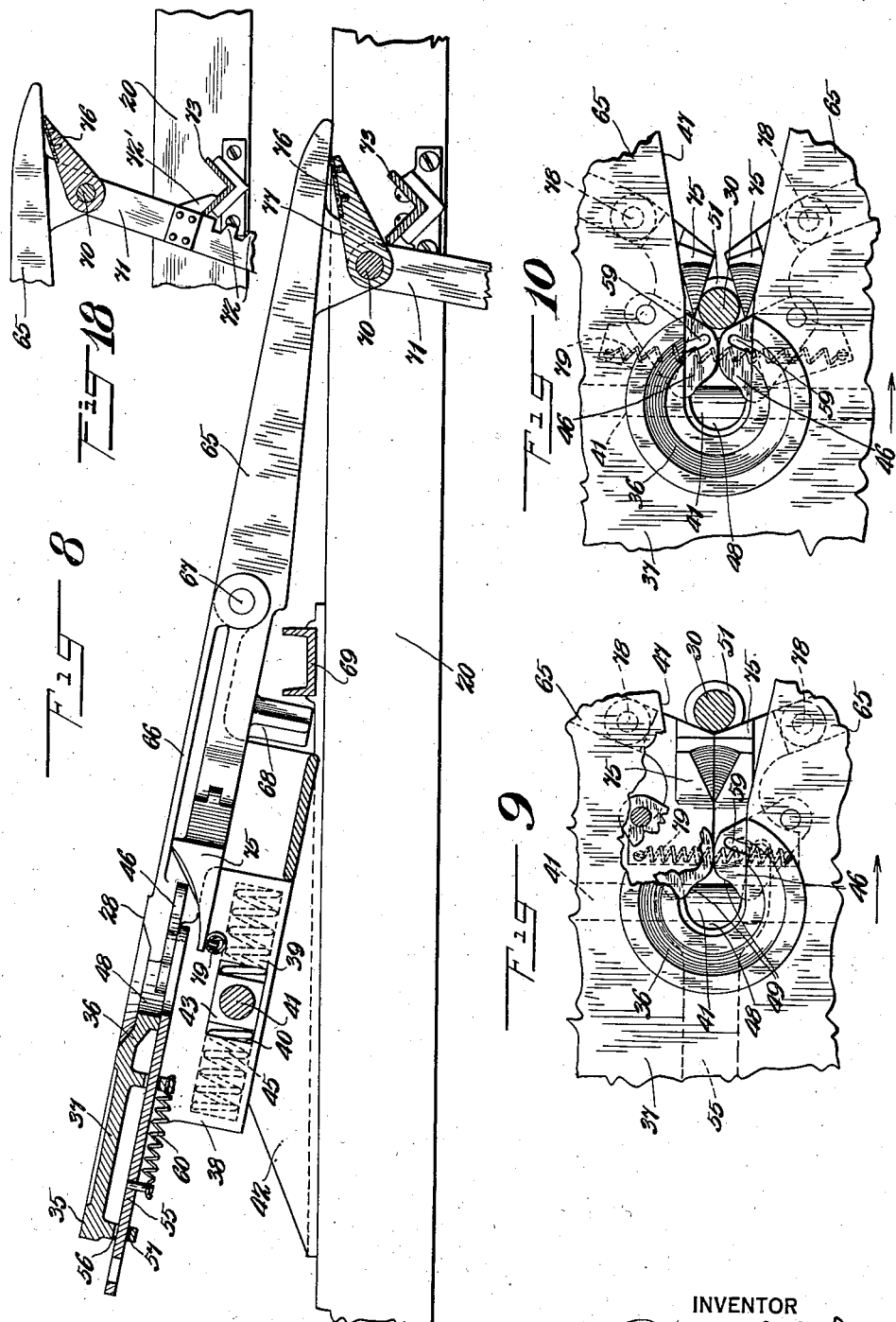
INVENTOR
Howard E. Swift.
BY
John D. Morgan
ATTORNEY Jan. 5, 1937. H. E. SWIFT 2,066,430
MOTOR VEHICLE
Original Filed Sept. 25, 1930  7 Sheets-Sheet 6
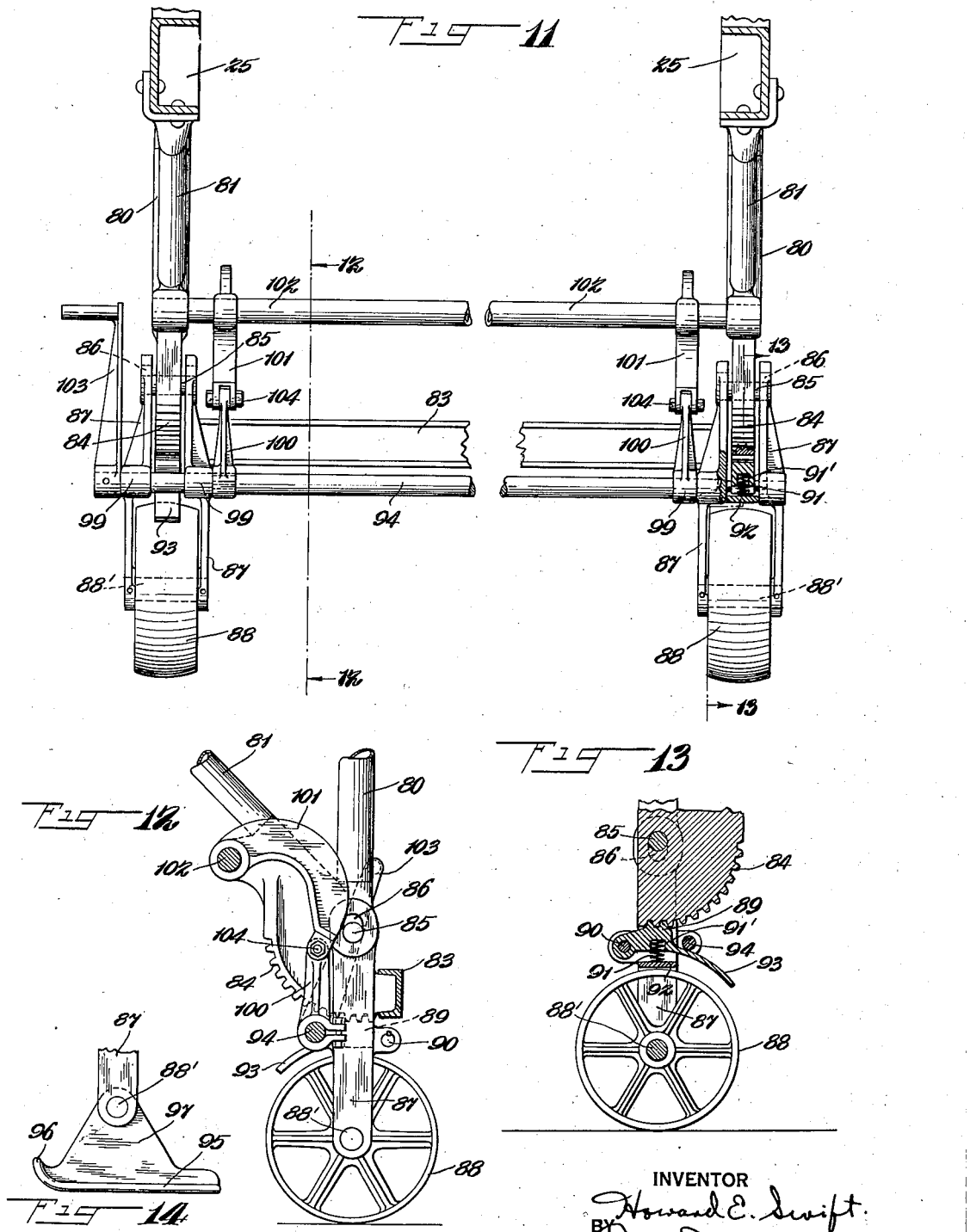
INVENTOR
Howard E. Swift
BY John D. Morgan
ATTORNEY

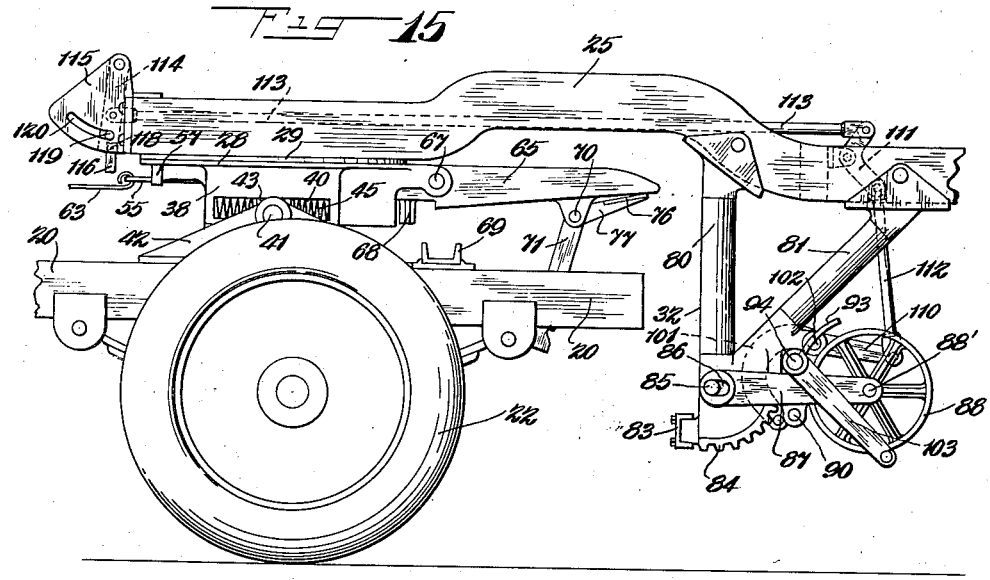
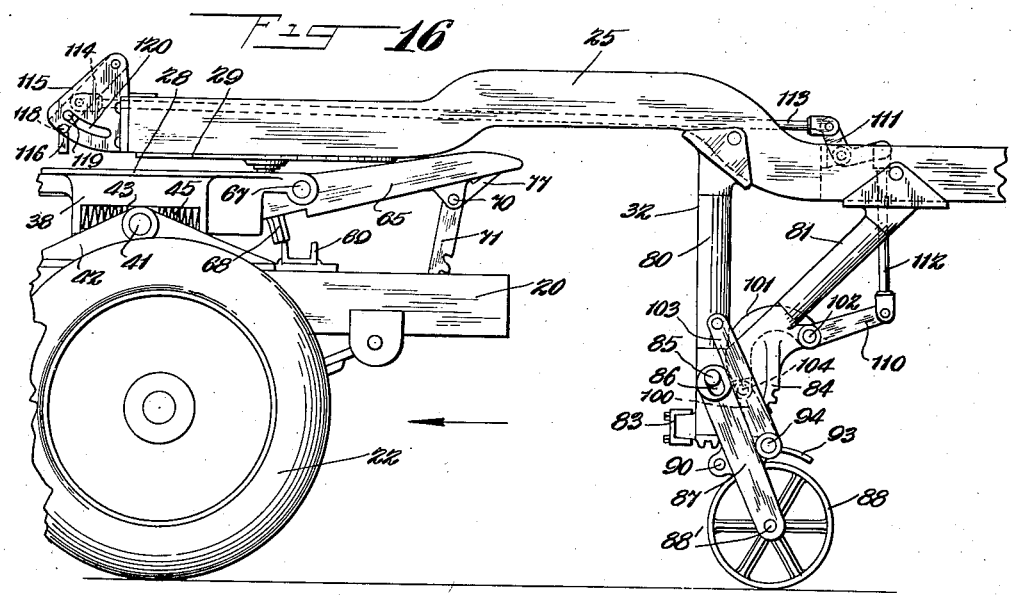
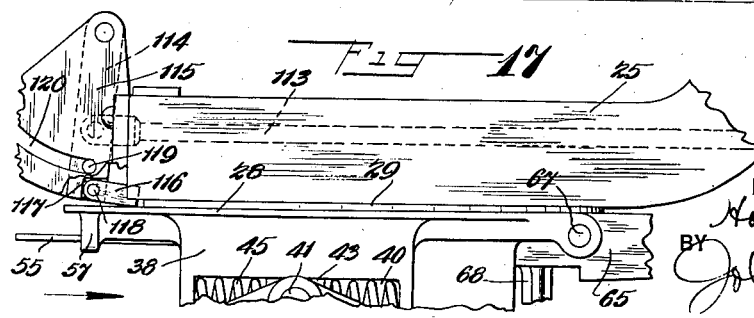

Patented Jan. 5, 1937

2,066,430

UNITED STATES PATENT OFFICE 2,066,430

MOTOR VEHICLE

Howard E. Swift, Westfield, Mass.

Application September 25, 1930, Serial No. 484,368
Renewed May 25, 1936

18 Claims. (Cl. 280—33.1)

The present invention relates to motor vehicles and more particularly to a new and improved motor vehicle of the type comprising a tractor unit and a trailer unit adapted to be coupled together.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation, with certain parts broken away, of the present preferred and illustrative embodiment of the invention, with the semi-trailer or trailer unit coupled to the tractor for hauling.

Figure 2 is a view similar to Figure 1 with the semi-trailer and tractor in position for coupling.

Figure 3 is a view similar to Figure 1 with the semi-trailer and tractor in uncoupling position.

Figure 4 is a view similar to Figure 3, but showing a modified embodiment of the invention.

Figure 5 is a detail plan view of the improved fifth wheel forming part of the present invention.

Figure 6 is a detail longitudinal section taken on the line 6—6 of Figure 5 with the parts in hauling position.

Figure 7 is a view similar to Figure 6 with the parts arranged for uncoupling.

Figure 8 is a similar view of the lower fifth wheel, forming part of the present invention, positioned for coupling to the upper fifth wheel carried by the semi-trailer.

Figures 9 and 10 are detail plan views with certain parts broken away, of the king pin locking mechanism carried by the lower fifth wheel.

Figure 11 is a vertical section taken on the line 11—11 of Figure 2 and showing in detail the supporting mechanism for the front end of the semi-trailer.

Figure 12 is a detail vertical section taken on the line 12—12 of Figure 11.

Figure 13 is a detail vertical section taken on the line 13—13 of Figure 11.

Figure 14 is a detail side elevation of a modified embodiment of the supporting mechanism for the front end of the semi-trailer.

Figure 15 is a fragmentary and detail side elevation of the embodiment shown in Figure 4 showing the parts in position for hauling.

Figure 16 is a similar view with the parts in position for uncoupling and showing the automatic release for the semi-trailer supporting mechanism.

Figure 17 is a similar view of the parts during the final stages of coupling the semi-trailer and tractor.

Figure 18 is a fragmentary detail, central and longitudinal section of a modified embodiment of the lower fifth wheel member shown in Figure 6.

The present invention has for its object the provision of a new and improved automotive vehicle in which the tractor and semi-trailer are coupled together without raising or lowering the semi-trailer during the coupling operation. A further object is the provision of a novel vehicle of the type described in which the front end of the trailer is lifted as it is uncoupled from the tractor. Still another object is the provision of automatic means for effecting all the operations of uncoupling thereby freeing the operator of the tractor from these duties and insuring that the uncoupling does not take place when the various parts are not properly positioned. Another object of the invention is the provision of coupling means for a vehicle of the type described which enables the trailer to be coupled even though the front end of the trailer may have lowered during the time it is uncoupled.

In accordance with the present invention, the vehicle comprises a tractor, a semi-trailer, a support for the front end of the semi-trailer while uncoupled, and coupling means for securing the tractor and semi-trailer together while the semi-trailer is hauled by the tractor.

The tractor and semi-trailer are preferably of conventional construction but may be varied widely, dependent on the particular use to which the veihcle is to be put.

The coupling means preferably comprises means for pivotally securing the front end of the semi-trailer to the rear end of the tractor and for supporting the front end of the semi-trailer on and by the rear end of the tractor. In accordance with the present invention, these coupling means also include means for raising the front end of the semi-trailer as the semi-trailer is uncoupled from the tractor to raise the semi-trailer slightly more than the distance the springs are compressed by that portion of the normal load of the semi-trailer which is carried by the tractor, thereby enabling the tractor to be backed beneath the front end of the semi-trailer without raising or lowering the front end of the semi-trailer until the coupling is fully completed. Means are also provided for automatically coupling the tractor and semi-trailer together and other means are provided for supporting the front end of the semi-trailer while uncoupled in substantially the highest position to which it is raised.

It will be understood that the foregoing general description and the following detailed description as well are exemplary and explanatory of the invention but are not restricted thereon.

Referring now in detail to the present preferred and illustrative embodiment of the invention as shown in the accompanying drawings, there is provided a tractor unit, of conventional construction, coupled with a semi-trailer. The tractor unit comprises the usual frame 20 supported on the steering wheels 21 and driving wheels 22 by means of the usual springs 23 and carries, at its rear end, the coupling means which will be later described. The trailer unit, or semi-trailer, comprises a body 24 and frame 25 at the rear of which is a pair of wheels 26 supporting the frame by means of springs 27. The front end of the semi-trailer is provided with the coupling means by which the semi-trailer is coupled to the tractor, so that the semi-trailer can be hauled by the tractor and a portion of the load of the semi-trailer will be supported by the driving wheels of the tractor. The semi-trailer is also provided, near its front end, with a prop or supporting mechanism 32 as will be later described in detail, by which the front end of the semi-trailer is supported while the semi-trailer is uncoupled from the tractor.

As embodied, the coupling means comprises a pair of cooperating fifth wheel members, the lower fifth wheel member 28 being mounted on the tractor, while the upper fifth wheel 29 is mounted on the under side of the front end of the semi-trailer. The upper fifth wheel 29 comprises a guide pin 30, a bolster plate 30a and a substantially flat annular member 31, mounted concentrically with the pin and medianly of the semi-trailer frame 25, both the guide pin and annulus being rigidly fastened to the frame by suitable means.

The lower fifth wheel member 28, in the present embodiment, comprises a substantially flat surfaced, generally circular plate 34 having a raised annular and marginal portion 35 forming the fifth wheel portion of the member, and a bolster plate 36 connected therewith by means of web 37. As shown, the lower fifth wheel member is provided with downwardly projecting portions 38 forming two parallel depending boxes 39 parallel to each other and the longitudinal center line of the tractor. The side walls of the boxes 39 are slotted, as at 40, and through these slots extends a shaft 41 which is supported on the side frames 20 by brackets 42 which are rigid on the frame. Rotatable on the shaft, and within each box 39, is a block 43 between which and the ends of the boxes are compressed springs 45 functioning as shock absorbers, at the same time permitting the fifth wheel to rock about its horizontal transverse axis.

For pivotally locking the fifth wheel together while the semi-trailer is being handled, means are provided on the lower fifth wheel member for engaging and securely holding the upper fifth wheel member in such a position that the upper and lower annuli 31 and 35 are concentric and in contact with each other. As embodied, a pair of locking or latching members 46 are pivotally mounted on the under side of the web 37, at either side of the guideway 47 through which the guide pin 30 moves during coupling and uncoupling, and converge towards the circular opening 48 in the central portion of web 37. Latches 46 are provided with concave faces 49 which together with the opening 48 form a socket only slightly larger than the downwardly projecting portion 50 of bolster plate 30a with which they normally engage. For limiting relative vertical movement of the fifth wheel members while the vehicles are coupled together, the head 51 of guide pin 30 is slightly larger than the portion 50 and cannot move upwardly beyond the latches 46. In this way, the tractor and semi-trailer are securely coupled together while free pivotal movement of the vehicles is permitted.

For moving the latching members 46 apart to permit uncoupling of the semi-trailer from the tractor, a forked operating bar 55 is provided and is slidably mounted on the under side of the lower fifth wheel member 28 by means of the slots 56 formed in the depending projections 57. The forked portion of bar 55 extends rearwardly on either side of guide pin 30 and is provided with pins 58 which project into slots 59 formed in the latching members 46. Slots 59 are preferably spiral and are so positioned that as the bar 55 is pulled away from the pin 30, the latching members 46 are moved away from each other. For returning the operating bar 55 to normal position and for moving the latching members 46 to coupling or latching position, a tension spring 60 is connected to bar 55 and the rear projection 57. To facilitate uncoupling and enable the operator to uncouple the vehicles without leaving the tractor cab 61, bar 55 may be connected with an operating handle 62 in the cab by means of a cable 63.

In accordance with the present invention, the front end of the semi-trailer is lifted during uncoupling to compensate for the compression of the springs of the tractor as they support the weight of the semi-trailer, thereby avoiding the necessity of lifting the semi-trailer during coupling. As embodied, a pair of rearwardly divergent guides 65 are pivotally mounted on the lower fifth wheel member 28 and form a continuation of the rearwardly extending guides 66, which are preferably integral with the parts 35, 36 and 37. Guides 65 are pivoted on and beneath guides 66 by means of pins 67 which are preferably alined with each other, and the upper surfaces of guides 65 are preferably a continuation of and normally lie in the same plane as the upper surfaces of the guides 66. For supporting guides 65 in an upwardly and rearwardly inclined position, they are provided with downwardly extending integral projections 68 adapted to rest on the cross frame member 69 which extends between the side frame of the tractor, and at their rear ends are connected together by a rod 70 on which are pivoted latch bars 71 provided with teeth 72 to engage the angle bar 73 extending between and supported by the side frames 20. Guides 65 coact with the rear side of the upper fifth wheel 29, acting as an inclined plane to progressively lift the front end of the semi-trailer as the tractor is moved away from the semi-trailer.

In the present embodiment, means are provided for automatically raising the guides to their inclined, or uncoupling position, and comprise small wedge-shaped blocks 75 fixed to the forward or converging ends of the guides and lying beneath the web 37 and slightly to the rear of the pin 30 in coupled position. The front or lowest edge of the blocks 75 lies slightly below the bottom of pin 30 and as the blocks are moved forwardly during uncoupling, the blocks 75 are depressed, inclining the guides 65 and raising them to uncoupling position, in which position they are held by the latch bar 71, which drops by gravity to engage its teeth with the cross bar 73.

Means are also preferably provided for lowering the guides as the uncoupling operation is completed, and for this purpose, means are provided for tripping the latch bar 71 at the rear of guides 65 as the guide pin passes over it. As embodied, bars 71 are rigidly connected with a tripping plate 76 by means of upwardly extending arms 77 on which the plate is mounted to extend transversely of the tractor and between and at the rear of guides 65, and this plate 76 extends into the path of the rearwardly moving guide pin 30 and is moved thereby as the plate is drawn along beneath the pin. At the final stage of uncoupling, the pin 30 contacts with plate 76 and moves plate 76 rearwardly, disengaging teeth 72 and allowing the guides 65 to drop.

In the present embodiment, means are provided for moving the guide lifting blocks 75 out of the path of pin 30 as the semi-trailer is coupled to the tractor, and for this purpose, the blocks 75 are pivoted to the forward ends of guides 65 by means of pins 78 and have their inner and adjacent faces in contact with each other, and these blocks are provided with inclined rear faces which facilitate the spreading apart of the blocks by pin 30 against the tension of spring 79 which tends to hold them together.

Means are also provided for supporting the front end of the semi-trailer while it is left standing, uncoupled from the tractor, and as embodied, these means include a ground engaging member, such as a wheel or shoe, which can be raised and lowered relatively to the semi-trailer frame and is provided with means for maintaining it extended in the lowest position to which it drops, together with other means for releasing it and allowing it to be retracted without lifting the semi-trailer. On the under side of the semi-trailer frame 25, and near the front end thereof are provided a pair of supports 80, one on either side of the semi-trailer, and these supports are braced with respect to the frame by braces 81, and with respect to each other by channel 83. At the bottom of supports are provided segmental gears 84 which are axially alined and are rigid with respect to the supports 80 and braces 81. At the center of curvature of each segmental gear 84 is provided a short shaft 85 extending on both sides of the gears 84 and projecting into elongated slots 86 formed in the upper ends of arms 87, to loosely pivot the arms around the gears and to permit the arms to be moved toward and from the gears. At their lower ends, arms 87 are each provided with a wheel 88, which is adapted to engage the ground and is rotatably journalled in the arms by shafts 88'. Means are also provided for securely holding the arms and wheel at the lowermost position to which they are moved, and for this purpose a toothed member 89 is mounted on the arms 87 in position to engage the teeth of the gear segment whenever the wheel 88 is moved towards the segment, thereby preventing any movement of the arms while they support the weight of the semi-trailer.

For releasing the teeth and allowing the supporting means to be retracted without lifting the front end of the semi-trailer, the toothed members 89 are preferably pivoted on their respective arms by means of pin 90, and are pressed towards the segmental gears 84 by springs 91 which are held compressed and within a socket 91' on the under side of the toothed member by means of webs 92 extending between the arms of each pair. Toothed member is preferably provided with an extension 93, so that it can be conveniently pressed to release it from the segment, and a shaft 94 extending between the arms forms a stop to limit movement of the teeth.

If desired, and where a surface of greater area is needed for engagement with the ground, a shoe may be provided in place of the wheel 88. As shown in Figure 14, this shoe comprises a relatively large flat-bottomed piece 95 of strong metal provided with an upwardly turned front edge 96 and an upwardly extending web 97 centrally of the shoe, by which the shoe is pivotally connected with the arms 87.

For raising the supporting mechanism after coupling of the semi-trailer and holding it in raised position while the semi-trailer is coupled to the tractor, a shaft 94 is provided which is rotatably journalled in suitable sleeves 99 formed on the rear side of the arms 87. Shaft 94 carries a plurality of arms 100 which are pivotally connected by means of pivot pins 104 with a similar number of arms 101 mounted on shaft 102 which extends between supports 81, arms 100 being fast on shaft 94, while arms 101 are loose on cross rod 102. At one side of the supporting mechanism is provided a hand crank 103 fast on shaft 94 and by which the shaft and arms 100 may be turned to raise the arms 87 and place the supporting mechanism in running position. As crank 103 is turned clockwise (Figures 1 to 4) levers 100 and 101 are turned, raising the wheels 88 until shaft 94 has been moved beyond a position directly above pivot 104, which securely holds the wheels in raised position until the hand crank 103 is reversely moved.

In accordance with a modified embodiment of the invention, as illustrated in Figures 4, 15, 16 and 17 of the drawings, means are provided for automatically releasing the supporting means for the front end of the semi-trailer as it is uncoupled from the tractor, thereby avoiding the necessity of the operator's leaving the cab to effect the uncoupling. For this purpose a trip is preferably provided for lowering the support by the relative movement of the tractor and semi-trailer away from each other.

In the modified embodiment referred to, a lever 110 is rigidly mounted on shaft 102 and is connected through bell crank 111, and links 112 and 113 with an actuating lever 114 which is pivotally mounted at the extreme front end of the semi-trailer by means of brackets 115. At its lower end, lever 114 is provided with an extension 116 set in a recess 117 on the lower rear side of the lever (Fig. 17) and pivoted therein by means of pin 118 so that it can swing rearwardly independently of the lever, but any forward movement is transmitted to the lever. Extension 116 projects below annulus 31 and below the upper surface of the lower fifth wheel 28 so that as the lower fifth wheel is moved forwardly, lever 114 is also moved, raising lever 110 and lowering the wheel supporting arms 87. For limiting movement of lever 114, it is provided with a pin 119 projecting into arcuate slot 120 formed in the side of bracket 115.

After coupling of the tractor and trailer, lever 114 may be restored to its normal position by raising the wheel and arms 101 using hand crank 103.

The operation of the above described mechanism may be briefly described as follows:—

While the semi-trailer is coupled to the tractor and is being hauled thereby, the front end of the semi-trailer is supported on the tractor by means of the fifth wheel members 28 and 29 and the semi-trailer is pulled along the road by latching members 46 which engage the cylindrical portion 50 of bolster 30a and vertical movement of the semi-trailer with respect to the tractor is limited by means of head 51 which cannnot pass upwardly through the socket 48. In going over uneven road, the semi-trailer can move angularly with respect to the tractor and in so doing rocks the lower fifth wheel member 28 about its supporting shaft 41 and in turning, the semi-trailer moves with respect to the tractor about the guide pin 30 as a pivot.

On reaching the destination where the semi-trailer is to be uncoupled, the operator turns crank 103 counter-clockwise (Figs. 1 to 3), lowering wheels 88 into contact with the ground, sets the brakes on the semi-trailer wheels 26 or blocks these wheels to prevent forward movement of the semi-trailer, then pulls up on handle 62 to move latching members 46 apart and drives the tractor forward. As the tractor moves forward, guide pin 30 engages blocks 75, raising guides 65 to the uncoupling position (Fig. 3) and teeth 72 engage cross bar 73 to support the guides in their raised position. On further movement of the tractor the upper fifth wheel rides up these guides, raising the front end of the semi-trailer slightly more than the distance the tractor springs 23 are compressed by the load of the semi-trailer. Just before the fifth wheel member 29 rides off the guides 65, guide pin 30 contacts with plate 76 and disengages arms 71 permitting the guides 65 to drop to the position shown in Figs. 2 and 8. During the raising of the semi-trailer, wheels 88 remain in contact with the ground, but as the semi-trailer moves downwardly a very slight distance teeth 89 are brought into engagement with the teeth on segment 84 securely holding the arms 87 extended and supporting the semi-trailer in raised position.

To pick up or couple the semi-trailer, the tractor, with the fifth wheel parts in the position shown in Figs. 2 and 8, is backed beneath the front end of the semi-trailer, the guides 65, 66 guiding pin 30 to the opening 48 until the pin 30 spreads blocks 75 as shown in Fig. 10, after which guide pin 30 spreads latching members 46 until the guide pin is properly positioned within the opening 48. At this time, the latching members 46 move together and securely couple the semi-trailer and tractor. The operator then depresses extension lever 93 to disengage the tooth member 89 from the segment 84 and turns hand crank 103 to lift the wheels 88 into running position.

In case the modified embodiment shown in Figs. 4, 15, 16 and 17 is employed, the operation is the same except that the operator need not turn crank 103 to lower the wheels 88, as this is accomplished automatically at the beginning of the uncoupling.

Should the front end of the semi-trailer sink while standing due to soft ground on which the wheels 88 rest, the guides 65 will serve to lift the front end of the semi-trailer so that coupling can be accomplished. However, if such sinking is to be expected, it is preferable to raise the guides 65 manually to a greater extent just prior to uncoupling and secure them in raised position by one of the lower notches on arm 71, thereby avoiding the necessity of raising the front end of the semi-trailer during coupling.

In accordance with the modification shown in Figure 18, means are provided for normally holding the guide members in horizontal position, and for this purpose the mass of the fifth wheel member 28 is so distributed relative to shaft 41 that it would normally tilt forwardly and downwardly except for the weight of the guides 65. On each latch bar 71 is provided a finger 72' which projects rearwardly from and is rigidly secured to the bar and is adapted normally to engage the angle bar 73, thereby holding the fifth wheel member in a horizontal position while allowing it to be rocked as the vehicle moves over uneven road. The guides 65 are dropped on completion of the uncoupling to the position shown in Figure 18. Should the front end of the semi-trailer sink while uncoupled, or be below the normal level of the guides 65 for any reason, the operator can move bar 71 forwardly, thereby dropping the guides to their extreme lower position (Fig. 8) before coupling. In other respects, this modified embodiment is similar to that previously described.

The invention in its broader aspects is not limited to the specific mechanisms shown and described but departures may be made therefrom within the scope of the accompanying claims without departing from the principles of the invention and without sacrificing its chief advantages.

What I claim is:—

1. A motor vehicle including in combination a semi-trailer having rear wheels and a support for the forward end of the semi-trailer, a tractor having independent driving and steering wheels, means detachably connecting the tractor and semi-trailer and inclinable guides for automatically elevating the forward end of the latter to raise its front end from the ground during uncoupling of the tractor and semi-trailer.

2. A motor vehicle including in combination a tractor and semi-trailer, means for supporting the front end of the semi-trailer while uncoupled from the tractor, means for raising the front end of the semi-trailer as the vehicles are uncoupled, means for extending the support as the vehicles are uncoupled, and means for lowering the semi-trailer raising means so that the vehicles can be coupled without raising the semi-trailer or for lowering said raising means below its normal level so that the semi-trailer may be raised by the coupling operation.

3. A motor vehicle including in combination a semi-trailer, a tractor and coupling means therefor including a normally horizontal member carried by the tractor, a coupling member carried by the semi-trailer, and means for swinging the normally horizontal member to and holding it in an upwardly and rearwardly inclined position prior to uncoupling.

4. A motor vehicle including in combination a semi-trailer, a tractor and coupling means therefor including a coupling member carried by the semi-trailer, a guide and cooperating coupling member carried by the tractor, and means for raising the rear end of the guide prior to uncoupling of the tractor and semi-trailer.

5. A motor vehicle including in combination a semi-trailer, a tractor and coupling means therefor including a coupling member carried by the semi-trailer, a guide and cooperating coupling member carried by the tractor, means for holding the guide in a rearwardly and upwardly inclined position and means for lowering the guide at the end of the uncoupling movement.

6. A motor vehicle including in combination a semi-trailer, a tractor and coupling means therefor including a coupling member carried by the semi-trailer, a guide for the coupling member and a cooperating coupling member both carried by the tractor and a support for holding the guide in a rearwardly and upwardly inclined position.

7. A motor vehicle including in combination a semi-trailer, a tractor and coupling means therefor including a coupling member carried by the semi-trailer, a guide and cooperating coupling member carried by the tractor, a support for holding the guide in a rearwardly and upwardly inclined position, means for raising the guide to said position and means for tripping said support at the end of the uncoupling position.

8. A fifth wheel structure comprising in combination upper and lower fifth wheel members adapted to be coupled together, pivoted guiding means mounted on said lower fifth wheel member and adapted to be rearwardly and upwardly inclined and means for securing said guiding means in raised position.

9. A fifth wheel structure comprising in combination upper and lower fifth wheel members adapted to be coupled together, pivoted guiding means mounted on said lower fifth wheel member, means for securing said guiding means in a rearwardly and upwardly inclined position and means for restoring said guiding means to a normal horizontal position by the uncoupling of the fifth wheel members.

10. A fifth wheel structure comprising in combination upper and lower fifth wheel members adapted to be coupled together, pivoted guiding means mounted on said lower fifth wheel member and means for automatically raising the guiding means to a rearwardly and upwardly inclined position by movement of the fifth wheel members during uncoupling.

11. A fifth wheel structure comprising in combination upper and lower fifth wheel members adapted to be coupled together, pivoted guiding means mounted on said lower fifth wheel member, means for automatically raising the guiding means to a rearwardly and upwardly inclined position by movement of the fifth wheel members during uncoupling and means for holding said guides in raised position during the uncoupling.

12. A fifth wheel structure comprising in combination upper and lower fifth wheel members adapted to be coupled together, pivoted guiding means mounted on said lower fifth wheel member, means for automatically raising the guiding means to a rearwardly and upwardly inclined position by movement of the fifth wheel members during uncoupling, means for holding said guides in raised position during the uncoupling and means for restoring said guides to normal horizontal position at the end of the uncoupling movement.

13. A fifth wheel structure comprising in combination upper and lower fifth wheel members adapted to be coupled together, pivoted guiding means mounted on said lower fifth wheel member, means for automatically raising the guiding means to a rearwardly and upwardly inclined position by movement of the fifth wheel members during uncoupling, means for holding said guides in raised position during the uncoupling, means for restoring said guides to normal position at the end of the uncoupling movement, and means for automatically locking the fifth wheel members together when fully moved to coupling position.

14. A fifth wheel structure comprising in combination upper and lower fifth wheel members adapted to be coupled together, pivoted members mounted on one of said members, means for swinging said pivoted members to an inclined position by relative horizontal movement of the fifth wheel members and means for restoring said pivoted members to their normal position by continued relative movement of the fifth wheel members.

15. A fifth wheel structure comprising in combination upper and lower fifth wheel members adapted to be coupled together, pivoted guiding members mounted on one of said members, said pivoted members being normally horizontally positioned, means for moving said pivoted members to a rearwardly and upwardly inclined position by relative movement of the fifth wheel members during uncoupling and for restoring said pivoted members to horizontal position at the end of the uncoupling movement, means for supporting said pivoted members in a rearwardly and downwardly inclined position and means for restoring said pivoted members to normal position on completion of the coupling movement of the fifth wheel members.

16. A fifth wheel structure comprising in combination upper and lower fifth wheel members adapted to be coupled together, pivoted guiding members mounted on one of said members said pivoted members being normally horizontally positioned, means for moving said guiding members to an inclined position by relative movement of the fifth wheel members and means for restoring said guiding members to horizontal position by further movement of the fifth wheel members.

17. A fifth wheel structure comprising in combination upper and lower fifth wheel members adapted to be coupled together, means for automatically coupling said members together, means for automatically raising the upper fifth wheel by relative movement of the fifth wheel members for uncoupling and means for automatically restoring the raising means to normal position on completion of uncoupling.

18. A motor vehicle including in combination a semi-trailer and a tractor having at one end a tiltable section to be moved into an upwardly and rearwardly inclined position and beneath one end of the semi-trailer, said section forming an inclined plane to raise the front end of the semi-trailer into an elevated position during movement to uncoupling position, and means for securing said section in an upwardly, rearwardly inclined, a downwardly, rearwardly inclined, or a horizontal position.

HOWARD E. SWIFT.